United States Patent [19]
Endo et al.

[11] Patent Number: 5,742,118
[45] Date of Patent: *Apr. 21, 1998

[54] ULTRAFINE PARTICLE FILM, PROCESS FOR PRODUCING THE SAME, TRANSPARENT PLATE AND IMAGE DISPLAY PLATE

[75] Inventors: Yoshishige Endo, Tsuchiura; Masahiko Ono, Ibaraki-ken; Hiromitsu Kawamura, Mobara; Katsumi Kobara, Mobara; Yoshifumi Tomita, Mobara; Masahiro Miyazaki, Mobara; Takao Kawamura, Chiba; Toshihiro Yamada, Ibaraki-ken; Toshiaki Kawabata, Tokyo; Takeshi Araya, Higashikurume, all of Japan

[73] Assignee: Hitachi, Ltd., Tokyo, Japan

[*] Notice: The term of this patent shall not extend beyond the expiration date of Pat. No. 5,707,685.

[21] Appl. No.: 230,252

[22] Filed: Apr. 20, 1994

Related U.S. Application Data

[63] Continuation-in-part of Ser. No. 855,055, Mar. 19, 1992, abandoned, and a continuation-in-part of Ser. No. 977,250, Nov. 16, 1992, Pat. No. 5,396,148, and a continuation-in-part of Ser. No. 62,747, May 18, 1993, and a continuation-in-part of Ser. No. 404,553, Sep. 8, 1989, Pat. No. 5,189,337.

[30] Foreign Application Priority Data

| Sep. 9, 1988 | [JP] | Japan | 63-224658 |
| Mar. 19, 1991 | [JP] | Japan | 3-054371 |
| May 18, 1992 | [JP] | Japan | 4-124502 |
| Apr. 20, 1993 | [JP] | Japan | 5-092651 |
| Jun. 30, 1993 | [JP] | Japan | 5-162420 |

[51] Int. Cl.$^6$ ............ C09K 3/16; B32B 18/00; H01J 29/88
[52] U.S. Cl. ............ 313/479; 313/473; 359/601; 428/325; 428/331; 428/446; 106/287.19; 106/287.34; 106/459; 106/286.4
[58] Field of Search ............ 313/479, 478, 313/473; 75/233; 359/601; 428/323, 325, 331, 426, 428, 446, 702, 206, 210, 212, 307.3, 402, 421, 447; 106/286.4, 287.19, 287.34, 459

[56] References Cited

U.S. PATENT DOCUMENTS

| 2,564,709 | 8/1951 | Moehel | 252/518 X |
| 3,484,284 | 12/1969 | Dates | 252/518 X |

(List continued on next page.)

FOREIGN PATENT DOCUMENTS

| 0051101 | 8/1984 | Japan . |
| 0124407 | 9/1990 | Japan . |

OTHER PUBLICATIONS

Physics of Thin Films; 2; 1964; Pages 243–284.
Applied Physics; Letter, vol. 36, No. 9; 1980, Pages 727–730.

Primary Examiner—Ashok Patel
Attorney, Agent, or Firm—Antonelli, Terry, Stout & Kraus, LLP

[57] ABSTRACT

An ultrafine particle film which has excellent anti-staining properties, is effective for the prevention of electrostatic charge and reflection of visible light and can be applied to a large area at low cost, and an image display plate such as the one adapted to a Braun tube to which the ultrafine particle film is applied, and a process for producing the ultrafine particle film which comprises attaching a coating solution bath 22 to a surface of a Braun tube 21, filling the bath with a coating solution 23 containing antistatic $SnO_2$ ultrafine particles so that the surface of the Braun tube 21 is covered with the coating solution, exposing the coated Braun tube surface at a predetermined rate to form an electrically conductive film on the Braun tube surface, the above process being repeated by using a coating solution containing the visible light anti-reflection ultrafine particles to form a visible light anti-reflection film on the electrically conductive film, and further applying thereon a water repellency treatment.

15 Claims, 9 Drawing Sheets

U.S. PATENT DOCUMENTS

| | | | |
|---|---|---|---|
| 3,861,978 | 1/1975 | Connole et al. | 106/286.4 X |
| 4,052,641 | 10/1977 | Dominick et al. | 373/479 X |
| 4,619,704 | 10/1986 | Hashimoto et al. | 106/286.4 |
| 4,694,218 | 9/1987 | Chao | 313/478 |
| 4,723,091 | 2/1988 | Kawamura et al. | 313/478 |
| 4,917,452 | 4/1990 | Liebowitz | 350/96.14 X |
| 4,945,282 | 7/1990 | Kawamura et al. | 373/479 |
| 5,165,992 | 11/1992 | Yasima | 428/328 |
| 5,225,274 | 7/1993 | Ogawa et al. | 428/447 X |
| 5,324,566 | 6/1994 | Ogawa et al. | 428/446 X |
| 5,466,523 | 11/1995 | Ogawa et al. | 428/446 X |

5,742,118

ULTRAFINE PARTICLE FILM, PROCESS FOR PRODUCING THE SAME, TRANSPARENT PLATE AND IMAGE DISPLAY PLATE

CROSS-REFERENCE TO RELATED APPLICATION

The application is a continuation-in-part application of Ser. No. 07/855,055, filed on Mar. 19, 1992, now abandoned, a C-I-P of Ser. No. 07/977,250 filed on Nov. 16, 1992, now U.S. Pat. No. 5,396,148, a C-I-P of Ser. No. 08/062,747 filed on May 18, 1993, PDN, and a C-I-P of application Ser. No. 07/404,553, filed Sep. 8, 1989, now U.S. Pat. No. 5,189,337.

BACKGROUND OF THE INVENTION

1. Field of the Invention

The present invention relates to a process for forming an ultrafine particle film, especially an ultrafine particle film having both anti-reflection and antistatic functions, a transparent plate and an image display plate formed by applying this technique, and a process for the production thereof.

2. Related Art

Films to reduce the reflectivity (anti-reflection films) capable of reflecting the visible light on a transparent plate surface have been long studied, and have been applied to lenses for cameras and ophthalmic glasses. At present, such films are used as an anti-reflection filter for reducing the reflected light on VDTs (visual display terminal). A variety of anti-reflection films have been proposed, and those mainly used now are multi-layered films and heterogeneous films.

A multi-layered film has a structure in which a material having a low refractive index and a material having a high refractive index are alternately stacked to form at least three layers. Its anti-reflection effect is a synergistic effect produced by the optical interference function of each layer. Multi-layered films are discussed in Physics of Thin Films, 2 (1964), pp. 242–284.

A heterogeneous film having a reflectivity distribution in the film thickness direction is generally formed by rendering a transparent plate surface porous.

Apl. Phys. Lett., 36 (1980), pp. 727–730 discusses a method of reducing the reflectivity in which a heterogeneous film is produced by forming an insular metal deposition film on a glass surface and forming a fine uneven surface by sputter etching.

On the other hand, in a cathode ray tube, it is required not only to form an electrically conductive film for preventing electrostatic charge on glass surface but also to use devices for preventing reflection.

Meanwhile, it is known that the front panel surface (image display plate) of a cathode ray tube such as a Braun tube is electrostatically charged. The reason therefor is as follows. Aluminum is generally deposited to form a thin and uniform film 94 on a phosphor 93 applied to an inner surface 92 of a Braun tube 91 as shown in FIG. 9. In the application of a high voltage to the aluminum film 94, an electrostatic charge occurs on a front panel 95 of the Braun tube due to electrostatic induction when the high voltage is applied and cut off.

JP-A-61-51101 discloses a method of preventing both electrostatic charge and reflection on such a display tube surface. In this method, first an electrically conductive film is formed on a glass substrate by a physical vapor phase method or a chemical vapor phase method such as vacuum deposition and sputtering, and then an anti-reflection film is formed thereon.

JP-A-4-12407 discloses a technique for providing water repellency to glass surface. This technique comprises forming a meal oxide film on a glass substrate by a pertinent method such as solution-gelation method, making fine unevenness on its surface and further coating thereon a water repellency agent. According to this technique, it is necessary to perform firing at a high temperature of around 500° C. for forming a stout metal oxide film. This high-temperature firing causes a decrease of the hydroxyl groups (OH) in the surface which are the functional groups for the reaction with the water repellency agent, and as a consequence, the reaction between the hydroxyl groups and the corresponding reactive groups of the water repellency agent is impeded to weaken adherence of the coating film to the substrate surface. In order to avoid this, fine unevenness is formed on the surface to produce an "anchor effect" which helps to elevate said adherence.

The above prior arts involve the problem of high cost as it is required to control the film thickness highly accurately. Also, the film forming method is limited to a sputtering or vacuum deposition method. Thus, it is substantially impossible to apply these prior art methods to a substrate having a large surface area, due to the restrictions on the apparatus which are inevitable in these methods.

The anti-reflectance films formed by the above methods are basically of a structure in which the materials differing in refractive index are deposited in layers on a glass surface, and reflection is prevented by an optical interference function of each layer.

For facilitating understanding of the anti-reflection mechanism, a most simple single-layer deposited film is considered here. When a glass surface having a refractive index of Ng is coated with a material having a lower refractive index than glass, Nf, to a thickness of d, the reflecting behavior of the light incident on this surface can be determined from the Fresnel's formulas, and the reflectivity R is given by the following equation 1:

$$R = \frac{(Nf^2 - Ng^2)}{(Nf^2 + Ng^2)} \qquad \text{(Equation 1)}$$

Here, it is assumed that there exists the relation of the following equation 2:

$$Nf \times d = \frac{\lambda}{4} \qquad \text{(Equation 2)}$$

where d is layer thickness, and $\lambda$ is light wavelength.

From the above equation, R=0 when Nf=$\sqrt{Ng}$. This signifies a state where there is no reflection of light with a wavelength of $\lambda$. Ng=1.52 for the most common soda glass, so that if it is coated with a material with Nf=1.23, there can be obtained an ideal anti-reflection film at a wavelength k which is decided according to the film thickness d. However, there is yet available no material having such a low refractive index, and among the materials usable at present, magnesium fluoride (MgF$_2$) with Nf=1.38 is the material having the lowest refractive index. In the above case, R=1.3%. Also, the anti-reflection conditions for a single-layer film, as apparent from the equations 1 and 2, are set for a specific wavelength $\lambda$, and the reflectivity increases around this specific wavelength $\lambda$. Therefore, in order to reduce the reflectivity in the whole region of visible light (400–700 nm), it was necessary to laminate the materials with different refractive indices to form a multi-layer structure while strictly controlling the film thickness. It is also possible to reduce surface reflection by use of a heterogeneous film having a refractive index distribution in the film thickness direction. In case the glass surface has such an unevenness as illustrated in FIG. 10, the refractive index (nF(x)) can be represented by the equation 3 when the coordinate in the layer depth direction is expressed by x:

$$nF(x) = ng \times V(x) + (1 - V(x)) \times n_0 \quad \text{(Equation 3)}$$

wherein ng is the refractive index of glass, V(x) is the volume occupied by glass at x, and $n_0$ is the refractive index of air.

In this case, the refractive index varies discontinuously at the interface between air and film and at the interface between film and glass substrate as shown in FIG. 11, so that when the refractive indices at these points are taken as $n_1$ and $n_2$, respectively, the reflectivity R of this layer is represented by the equation 4:

$$R = 1 - \frac{4n_0 n_1 n_2 ng}{(n_1 ng + n_0 n_2) - (n_1^2 - n_0^2)(ng^2 - n_2^2)\sin^2 \delta a/2} \quad \text{(Equation 4)}$$

$$\text{wherein } \delta a = \frac{2\pi}{\lambda} (n_1 + n_2) \cdot da$$

The reflectivities determined from the above equation at $n_0=1.0$ (refractive index of air), $n_1=1.1$, $n_2=1.47$ and ng=1.53 (refractive index of glass) with visible light wavelengths are graphically shown in FIG. 12. It is seen from this graph that the lowest reflectivity can be obtained when the surface unevenness is around 100 nm (0.1 µm). It is, however, difficult to provide an unevenness of such a size regularly on a glass surface, and much time is required for forming such an unevenness even by etching. The present inventors have previously proposed a film having low reflection characteristics comparable with a three-layer deposited film by forming said unevenness with ultrafine particles. This film showed a reflectivity of about 0.2–0.3%. The anti-reflection film having said unevenness formed with ultrafine particles is not only improved in anti-reflection characteristics but also shows good resolution and contrast well comparable with a three-layer deposited film. This film, however, has the problem that should this film have a stain such as a fingerprint, the stain may get into the unevenness of the film surface and is hard to remove.

SUMMARY OF THE INVENTION

The present inventors found that a thin film having an efficient electrical conductivity and anti-reflective function can be obtained by coating ultrafine particles composed of oxides having electrical conductivity and anti-reflective function on a surface of a display tube and the like, and this finding was filed for a patent as U.S. Ser. No. 07/977,250 on Nov. 16, 1992, now U.S. Pat. No. 5,396,148, whose content is incorporated herein for reference.

The present inventors had found that when the level of a mixed coating solution containing a determined amount of ultrafine particles is elevated up or down on the substrate surface at a constant rate, the ultrafine particles contained in the coasting solution are regularly arranged and applied on the substrate surface to give a low reflectivity close to a theoretical value, and this finding was filed for a patent as U.S. Ser. No. 07/855,055, now abandoned, whose content is incorporated herein for reference.

As a result of a further study, it has been found that by first applying the antistatic ultrafine particles and/or the infrared reflecting ultrafine particles on a substrate and then further applying thereon the ultrafine particles for preventing reflection of visible light, there can be obtained the more stabilized characteristics regardless of the substrate material, and this finding was filed for a patent as U.S. Ser. No. 08/062,747 whose content is also incorporated therein for reference.

As a result of further efforts for developing an ultrafine particle film which is highly protective against staining and from which stains, should they adhere, can be easily removed, the present inventors found that by treating the uneven substrate surface with an agent capable of forming a water repellent layer containing a silyl compound selected from the group consisting of chlorosilane compounds, alkoxysilane compounds and fluoroalkylsilane compounds and forming an ultra-thin film, preferably as a monomolecular layer, so that said unevenness formed with ultrafine particles would be left, it is possible to remarkably improve anti-staining properties and stain removability of the film without impairing the optical and electrical properties. The present invention has been attained on the basis of this finding.

An object of the present invention is to provide a visible light anti-reflection film, an antistatic film and/or an infrared-reflection film which can be produced at low cost, are highly proof against staining and can be applied to a large surface area, and an image display device having said film or films applied thereto.

Figure 1:
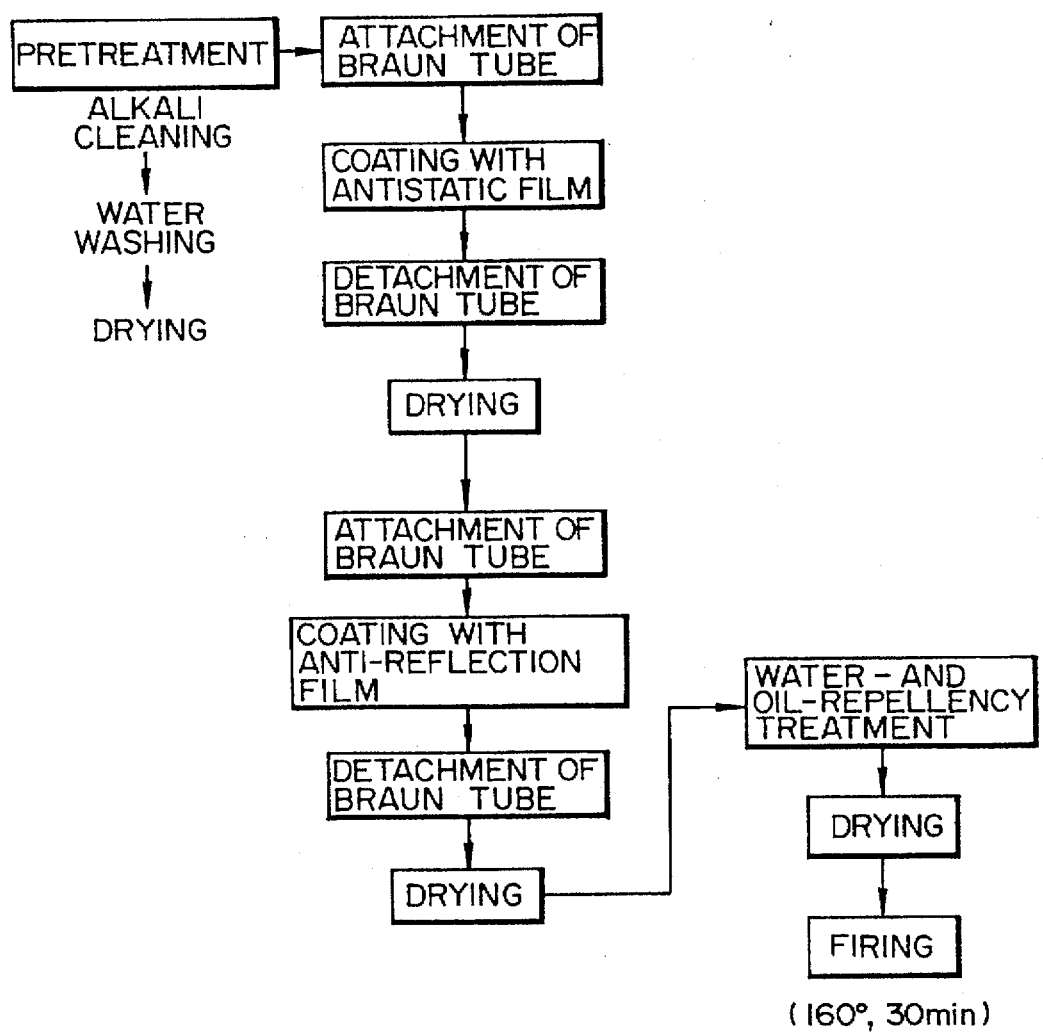
FIG. 1 is a block diagram of a film forming process in an embodiment of the present invention.

Reference numerals in the above Figures designate the following:

71: substrate, 72: antistatic layer, 73: binder, 74: anti-reflective layer, 75: water repellant layer, 21: Braun tube, 22:

coating solution tank, 23: coating solution, 24: solution feed valve, 25: draw valve, 26: metering pump, 27: solution tank, 28: solution-feeding pressure valve, 29: leaking valve, 31: glass plate, 32: conductive film, 33: ultrafine particles, 91: Braun tube, 92: inner surface of Braun tube, 93: phosphor, 94: aluminum film, 95: front pannel of Braun tube.

DETAILED DESCRIPTION OF PREFERRED EMBODIMENTS

The above object can be achieved by a process which comprises forming on a substrate surface at least one layer of ultrafine particle film composed of ultrafine particles and a binder filling the gaps between the ultrafine particles (said layer(s) of ultrafine particle film may hereinafter be simply referred to as ultrafine particle film) and forming on the surface of said at least one layer of ultrafine particle film a water-repellent, preferably water- and oil-repellent layer, and an ultrafine particle film produced according to the above process.

The water-repellent layer is 10 nm or less in thickness and formed with a silyl compound. Thus, the surface of this layer is covered with $CH_3$ group or $CF_3$ group, and there can be obtained a desired ultrafine particle film which is highly resistant to staining and from which stains, should they adhere, can be easily removed.

The water-repellent layer is usually formed as a monomolecular film on the surface of at least one layer of ultrafine particle film containing visible light anti-reflection ultrafine particles and antistatic ultrafine particles. As a result, there is formed an ultrafine particle film having the effect of inhibiting staining and allowing easy removal of stains should they adhere thereto, without causing substantially any change of the depth (20–100 nm) of fine unevenness of the ultrafine particle film surface, which is essential for maintaining the normal effect of the ultrafine particle film to prevent visible light reflection.

The material for the visible light anti-reflection ultrafine particles is selected from the group consisting of $SiO_2$ (silicon dioxide) and $MgF_2$ (magnesium fluoride). The material for the antistatic ultrafine particles is selected from the group consisting of $SnO_2$ (tin dioxide), $SnO_2+Sb_2O_3$ (antimony oxide), $In_2O_3$ (indium oxide), and $In_2O_3+SnO_2$. The material for the infrared-reflection ultrafine particles is selected from the group consisting of $SnO_2$, $SnO_2+Sb_2O_3$, $In_2O_3$, $In_2O_3+SnO_2$, $TiO_2$ (titanium oxide) and $ZrO_2$ (zirconium oxide).

In the process of this invention, the first-formed ultrafine particle film contains the antistatic ultrafine particles and the infrared-reflection ultrafine particles, and the next-formed ultrafine particle film contains the visible light anti-reflection ultrafine particles.

In case the substrate is glass, $Si(OR)_4$ (where R is alkyl) is used as binder. In this case, the substrate may be pretreated with an alkali and/or hydrofluoric acid. In case the substrate is a plastic, $Si(OR)_4$ (where R is alkyl) is used as binder while using a coupling agent having a functional group pertinent to the plastic. It is also desirable to pretreat the substrate with an alkali and/or hydrofluoric acid.

As for the coupling agent, γ-methacryloxypropyltrimethoxysilane is recommended when the plastic is an acryl resin, and γ-glycidoxydpropyltrimethoxysilane is preferred when the plastic is an epoxy resin.

An ultrafine particle film may be formed on both sides or on one side alone of the substrate.

The above anti-reflection ultrafine particles are preferably those having an average particle size (hereinafter simply referred to as particle size) of 40 to 200 nm, and the antistatic ultrafine particles are preferably those composed of a tin oxide compound having a particle size of 10 nm or less.

The substrate on which an ultrafine particle film is formed according to the above process is a transparent plate, and this transparent plate can be used as a liquid crystal panel, window glass for automobiles, a protective plate for the exhibits such as pictures, and the like.

An ultrafine particle film may be formed on a transparent substrate by the above method, and such a film-coated transparent substrate may be used as an image display plate or an image display protective plate. Further, such an image display plate or image display protective plate may be applied to a Braun tube.

Said substrate may not necessarily be a flat one; it may have a curved configuration such as front window of an automobile and lenses.

The water-repellent layer is usually formed on the ultrafine particle film containing visible light anti-reflection ultrafine particles by applying a silyl compound on said ultrafine particle film. Application of a silyl compound usually comprises coating thereof on said film, but in case the boiling point of the compound is low, application of the compound can be easily accomplished by exposing the ultrafine particle film to vapors of said compound. For coating of the compound, spraying, spin coating, dip coating or a combination thereof is employed.

There is employed a treating agent containing at least one selected from the group consisting of, as a silyl compound, chlorosilane compounds, alkoxysilane compounds and fluoroalkylsilane compounds. Said chlorosilane compounds include $CH_3SiCl_3$, $(CH_3)HSiCl_2$, $(CH_3)_2SiCl_2$, $(CH_3)_3SiCl$ and the like.

Said alkoxysilane compounds include $CH_3SiO(CH_3)_3$, $(CH_3)_2Si(OCH_3)_2$, $CH_3Si(OC_2H_5)_3$, $(CH_3)_2Si(OC_2H_5)_2$ and the like.

Said fluoroalkoxysilane compounds include $CF_3CH_2CH_2Si(OCH_3)_3$, $CF_3CH_2CH_2SiCl_3$, $CF_3(CF_2)_7CH_2CH_2SiCH_3Cl_2$ and the like.

The thus applied silyl compound is reacted with the hydroxyl groups of the ultrafine particles and the binder existing in plenty on the ultrafine particle film to form a monomolecular film. Therefore, no specific pretreatment is required for forming the water-repellent film.

For effecting substantially perfect reaction between said hydroxyl groups and the applied silyl compound, the latter is allowed to exist in a slightly greater quantity than the hydroxyl groups and fired at a relatively low temperature, such as 80°–160° C., to complete its reaction with the hydroxyl groups, with the unreacted silyl compound being removed.

In the process of this invention, since firing is performed as the final step for forming the antistatic and anti-reflection film, firing of the silyl compound can be accomplished concurrently with firing for forming the antistatic and anti-reflection film. That is, the antistatic and anti-reflection film is not fired immediately after formation thereof but is fired after the water-repellent film has been formed thereon.

Thus obtained ultrafine particle film shows excellent anti-reflection, antistatic characteristics and anti-stain properties.

It is generally known that when a film is formed from a coating solution containing no ultrafine particles by a dipping method, the following equation 5 holds between film thickness t and with drawl rate v:

$$t = k(\eta v/\rho g)^{0.5} \quad \text{(Equation 5)}$$

wherein η is the viscosity of a solution, p is the density of the solution, g is gravitational acceleration, and k is a constant.

On the other hand, the present inventors have found that when the level of a mixed coating solution containing relatively large anti-reflection ultrafine particles (40–200 nm) is elevated up or down on the substrate surface at a constant rate, the arrangement of the ultrafine particles varies greatly depending on the substrate material or the surface condition of the substrate. For instance, when the ultrafine particles are coated on a commercial plate glass, the arrangement of the ultrafine particles varies between the front and rear sides of the plate glass, resulting in different reflection characteristics between them. Analyses of the surface condition of such plate glass by a surface analyzer such as X-ray photoelectric spectrophotometer (XPS) detected a greater amount of $SnO_2$ (tin oxide) from the surface on one side. This is considered attributable to adhesion of tin to glass when the molten glass passes over the tin bath in the plate glass producing process. $SnO_2$ which has adhered to glass can hardly be removed even if the glass is subjected to a pretreatment (glass cleaning). It has been found that when a mixed solution containing the ultrafine particles is coated on a substrate of said surface condition, since its wettability is different from that of the ordinary surface condition, the substrate admits of thinner coating. This means that, as appreciated from Equation 5, it is possible to increase the coating rate for obtaining a same film thickness. An increase of coating rate naturally leads to a reduction of coating time, especially when the substrate to be coated is of a large surface area, and a reduction of manufacturing cost.

As explained above, difference in substrate material causes difference in surface condition, and this results in a change of wettability and a corresponding variation in thickness of the ultrafine particle film. Therefore, in order to obtain a same film thickness and a same arrangement of ultrafine particles, it needs to change the coating conditions for each substrate. Especially in the case of glass and plastic, since they are completely different in surface condition, it is necessary to give careful considerations on setting of the coating conditions including the pretreatment.

According to the process of the present invention, since the small ultrafine fine particles (10 nm or less) of an oxide such as $SnO_2$ or $In_2O_3$ (indium oxide) are applied as the antistatic and/or infrared-reflection ultrafine particles, it is possible to provide a uniform surface condition in the second and succeeding runs of coating even if the substrates to be treated are different in surface condition or composing material. It is thus possible to obtain the same film characteristics under the similar coating conditions. In case of using a mixed coating solution containing the small ultrafine particles of around 10 nm as said antistatic and/or infrared-reflection ultrafine particles, although the arrangement of the particles varies according to the difference in surface condition of the substrate, the particles need not be arranged regularly as in the case of an anti-reflection ultrafine particle film, so that the coated film is not affected by the substrate material and there can be obtained the antistatic and/or infrared-reflection films having the substantially constant characteristics (antistatic and/or infrared-reflection characteristics) by applying a same pretreatment and using the same coating conditions.

When the water repellency treatment is carried out with a silane compound such as mentioned above, the active hydrogen of the hydroxyl group in the ultrafine particle and binder surfaces is substituted with the silyl group, so that $CH_3$ group or $CF_3$ group alone exists in the surfaces to provide water repellency thereto.

In the case of an ultrafine particle film having fine surface unevenness, when the contact angle made by the film surface with water is 90° or less, an even higher degree of hydrophilicity is provided to enhance wettability. However, by applying a treatment that would make the contact angle greater than 90°, the apparent contact angle is enlarged to elevate water repellency. Therefore, when a water repellency treatment is applied to make the contact angle greater than 90°, there is provided higher water repellency than the ordinary flat plates. The similar phenomenon is observed with oil to provide high oil repellency. Thus, the film of this invention shows high protective effect against stains such as fingerprints containing oils.

EXAMPLES

The present invention will be described with regard to its embodiments by reference to drawings. First, the constituent requirements of the present invention will be explained.

(Ultrafine Particles)

The ultrafine particles are not specifically limited in function as far as the transparency and the light transmission properties are not hindered, but refer to those having a submicron average particle diameter. Typical functions thereof are antistatic, anti-reflection and/or infrared-reflection.

The material for the anti-reflection ultrafine particles is preferably selected from the group consisting of $SiO_2$ (silicon dioxide) and $MgF_2$. The material for the antistatic ultrafine particles is preferably selected from the group consisting of $SnO_2$, $SnO_2+Sb_2O_3$ (antimony oxide), $In_2O_3$, and $In_2O_3+SnO_2$. The material for the infrared-reflection ultrafine particles is preferably selected from the group consisting of $In_2O_3$, $In_2O_3+SnO_2$, $TiO_2$ (titanium oxide) and $ZrO_2$ (zirconium oxide).

The above anti-reflection ultrafine particles preferably have an average particle size of 40 to 200 nm. When this average particle size is less than 40 nm, the obtained film may have too flat an outermost surface, and no sufficient anti-reflection effect may be obtained. When it is more than 200 nm, a sufficient anti-reflection effect can be obtained, but diffuse reflection increases. As a result, the film is pacified, and at the same time, the resolution may be decreased. Therefore, the particle size of the anti-reflection ultrafine particles is preferably 40 to 200 nm. Accordingly, the depth of the gaps formed between the ultrafine particles is 20 to 100 nm. All the materials, $SiO_2$, $MgF_2$, etc., for the anti-reflection ultrafine particles have a refractive index of not more than 1.50.

The antistatic ultrafine particles preferably have an average particle size of not more than 10 nm. The ultrafine particles different in kind may be used in combination. When the ultrafine particles having an average particle size of not more than 10 nm are contained in the coating solution, there can be obtained the relatively uniform films even if the substrate varies in surface condition. Also, even if the coating solution is applied thickly, the possibility of causing a reduction of transmittance or clouding of the film is surprisingly small.

Examples of the ultrafine particles having a clear electrically conductive function, an infrared-reflection function or an electromagnetic wave shielding function include metal oxides such as $SnO_2$, $In_2O_3$, $TiO_2$ and $ZrO_2$ and mixtures thereof. Preferred is $SnO_2$+10 wt % $Sb_2O_3$ or $In_2O_3$+5 wt % $SnO_2$, since this combination is excellent in electrically conductive properties and infrared reflection characteristics. The film thickness is preferably 0.1 to 0.5 µm, and the particle size is preferably 5 to 50 nm. The metal oxides having clear electrically conductive properties or mixtures thereof show high light transmittance in the visible light region due to their large energy band gap, which is 3 eV or above. They also show high electrical conductivity as they have a high free electron density owing to the deviation in these metal oxides or mixtures thereof from their stoichiometrical composition and the addition of impurities. Even if the ultrafine particles are not in direct contact with each other, in other words, even if the binder and/or other matter exists between the ultrafine particles, the film shows electrical conductivity owing to the tunnel effect if the film thickness is sufficiently small. For having an antistatic function, the film is merely required to have an electrical conductivity on the order of $10^6$ (the sixth power of 10) to $10^9$ (the ninth power of 10) $\Omega/cm^2$, so that the ultrafine particles to binder mixing ratio can be selected from a relatively wide range.

(Light-transmitting Substrate)

The light-transmitting substrate may be a glass plate, a plastic plate or a plastic film. Examples of the main component of the plastic plate include polyethylene, polypropylene, urethane, acryl, phenol, epoxy, melamine, polyamide, polyimide, polycarbonate, butyl, epoxyphenol, vinyl chloride and polyester. The surface of the substrate on which an ultrafine particle film is to be formed may not only be planar, but may have a curvature like a Braun tube or front window of an automobile. Further, an ultrafine particle film may be formed on one surface or both surfaces. The surface on which said film is formed can be freely chosen according to the purpose of use and other matters.

(Pretreatment)

When the wettability to a substrate is considered, it is preferred to carry out a preliminary treatment with an alkali or hydrofluoric acid. In the case of a plastic substrate, a pretreatment with a neutral detergent is also effective.

(Application Method)

The exposing rate of a substrate after covered with a coating solution is preferably not more than 10 mm/s. This exposing rate may be kept constant or varied according to the shape of the object to be coated (substrate). The substrate may be rested in a container, or the substrate surface may be exposed through a hole provided in a side of the container. The latter is suitable for forming an ultrafine particle film on nearly completed product such as a Braun tube.

In the application method described above, an example of dipping techniques was employed, but it is also possible to employ other dipping techniques, spin coating, spraying, a combination of these techniques or a combination thereof with the above-described dipping method.

(Coating Solution)

When the ultrafine particle film of the present invention is formed, there is used a coating solution which contains a predetermined amount of ultrafine particles and a binder, and further contains a coupling agent and other additives as required (U.S. Ser. No. 07/855,055, now abandoned, is referred to for further details on this matter).

When the light-transmitting plate is a glass product, it is preferred to use $Si(OR)_4$ (where R is alkyl) as a binder. When the plate is plastic, it is preferred to use $Si(OR)_x$ (where x is 2 to 4, preferably 3) as a binder. Further, when the light-transmitting plate is made of a plastic material, it is preferred to use a coupling agent having a functional group which suits the plastic material.

When the light-transmitting plate is a glass product, the ultrafine particles are dispersed in a solution of $Si(OR)_4$ (where R is alkyl) in an alcohol. When the plate is a plastic, the ultrafine particles are dispersed in a solution of a silane coupling agent having a functional group easily reactive to this polymer of the plastic and $Si(OR)_x$ (where x is 2 to 4, preferably 3) in an alcohol or in a solution of a mixture of the above $Si(OR)_4$ and a silane coupling agent in an alcohol.

The above solution is applied to a light-transmitting plate and the applied surface is heated (or fired) to form a film. Due to this heat treatment, the above $si(OR)_4$ or the silane coupling agent is decomposed into $SiO_2$, etc., to work as an adhesive between the ultrafine particles and the substrate.

The R in the $Si(OR)_4$ is preferably an alkyl group having 1 to 5 carbon atoms. Meanwhile, the silane coupling agent is required to be suitably selected depending on polymer materials of the light-transmitting plate.

For example, when the light-transmitting plate is formed mainly from polyethylene, polypropylene, urethane or acryl resin, a silane coupling agent such as vinyltriethoxysilane or γ-methacryloxypropyltrimethoxysilane is effective. When the plate is formed from phenol, epoxy, melamine, polyamide, polyimide or polycarbonate resin, a silane coupling agent such as γ-aminopropylethoxysilane or γ-glycidoxypropyltrimethoxysilane is effective. Further, when the plate is formed from butyl, epoxy phenol, vinyl chloride or polyester, a silane coupling agent such as β,3, 4-epoxycyclohexylethyltrimethoxysilane or λ-glycidoxypropyltrimethoxysilane is effective.

The alcohol in which the $Si(OR)_4$ or the silane coupling agent is to be dissolved shows an increase in viscosity with an increase in the number of carbon atoms of the above R. In view of operability, therefore, the alcohol can be suitably selected so as not to increase the viscosity to excess. The generally usable alcohol is selected from alcohols having 1 to 5 carbon atoms.

Further, to decompose the $Si(OR)_4$, water and a mineral acid such as nitric acid may be added when the coating solution is prepared.

(Water and/or Oil Repellency Agent)

The water and/or oil repellency agent used in the present invention is selected from the group including the silyl compounds such as chlorosilane compounds, alkoxysilane compounds and fluoroalkylsilane compounds as mentioned above. In case the silyl compound employed is of a low viscosity, it can be directly used as a coating agent. In case the silyl compound employed is of a high viscosity, it is diluted with a solvent and then used as in the case of the coating solution described above. In case of using a silyl compound with a low boiling point, the substrate coated with an ultrafine particle film is simply placed in a container filled with vapors of said compound. It is also possible to use the water and/or oil repellency agent in a liquid state and apply it by dipping, spin coating, spraying or other suitable method.

The following is an embodiment of the present invention as it was applied to the front panel (glass face plate) of a Braun tube.

FIG. 1 is a block diagram illustrating the process in this embodiment of the invention.

First, the surface of the Braun tube is alkali-cleaned and washed with pure water, and then a gas, such as nitrogen gas, is blown thereto so that no marks of waterdrops will be left on the surface. Then the Braun tube is attached to a coating device and a coating solution containing the conductive ultrafine particles is applied thereto. The coating device and the coating method are described later. Typical examples of the coating solution composition and the coating conditions applied in this coating operation are shown in Table 1. After coating, the Braun tube is left as it is for a given period of time, then detached from the coating device and dried with nitrogen gas. Drying may also be accomplished by gas drying, cold- or hot-air drying using clean air or furnace drying. After drying, the Braun tube is attached to another coating device of the same specifications as the first used one, and a coating solution containing the anti-reflection ultrafine particles is applied thereto. Then the Braun tube is placed in a closed vessel filled with vapors of a chlorosilane compound and, after kept therein for a prescribed period of time, dried in the same way as described above. Typical examples of the coating solution composition, water and oil repellency agent and coating conditions used in this coating operation are shown in Table 1.

TABLE 1

|  | Antistatic solution (1st layer) | Anti-reflection solution (2nd layer) | Water and oil repellency treating solution |
|---|---|---|---|
| Solvent (Mixed alcohol) | 95 wt % | 92 wt % | — |
| Binder [Si(OR)$_4$] | 3 wt % | 3 wt % | — |
| Ultrafine particles | SnO$_2$ (particle diameter: 6 nm) 2 wt % | SiO$_2$ (particle diameter: 120 nm) 5 wt % | — |
| Coating rate | 3.0 mm/s | 2.5 mm/s | — |
| Water and oil repellency agent | — | — | (CH$_3$)$_2$SiCl$_2$ |
| Coating time | — | — | 5 min. |

Then the Braun tube is detached from the coating device and the coated surface is fired at 160° C. for 30 minutes in a furnace. Firing may be performed by ultraviolet or infrared heating. As a result of firing, the ultrafine particles fastly adheres to the Braun tube surface. The above process forms an antistatic, anti-reflection and water-repellent film.

Figure 2:
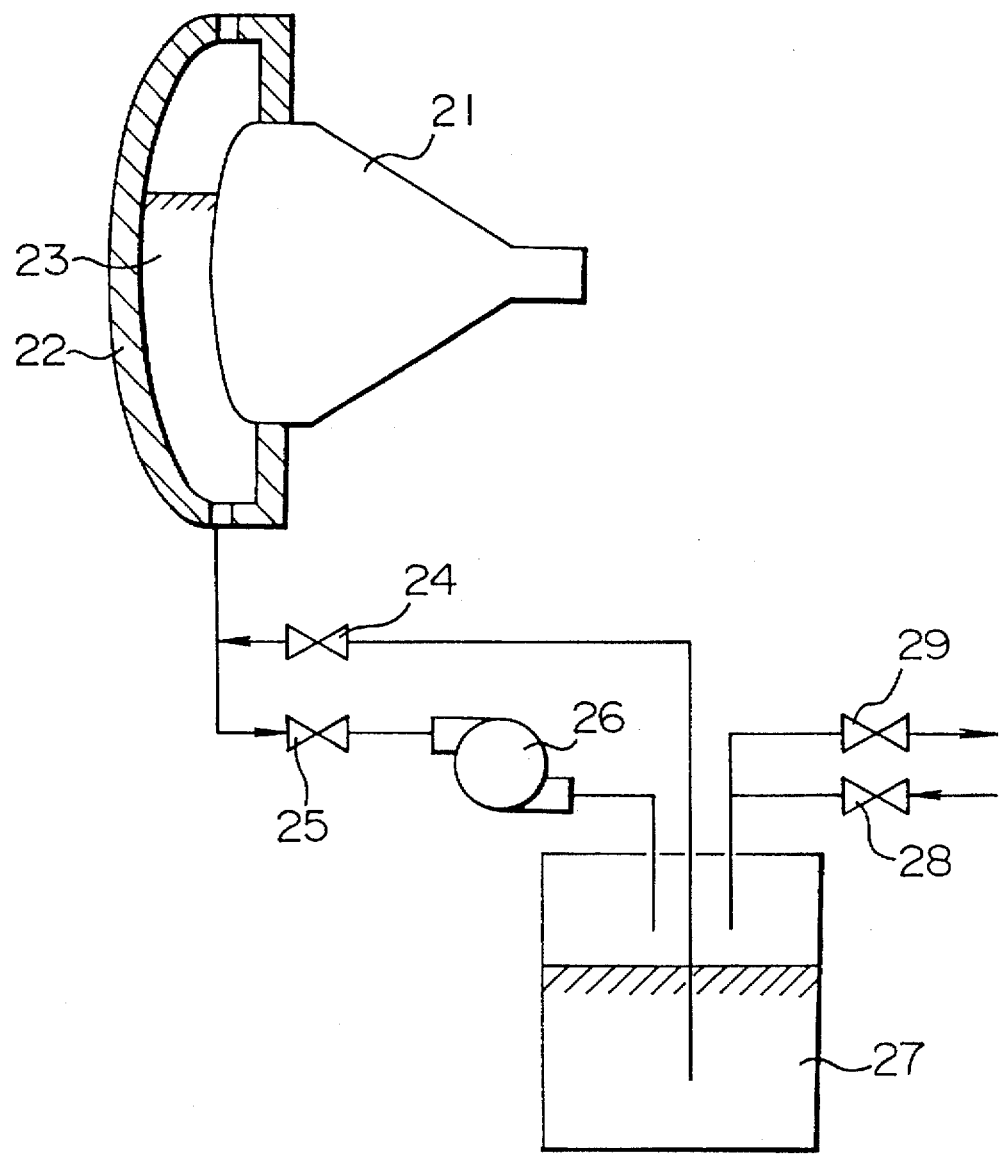
FIG. 2 is a layout drawing of a device of one embodiment of the present invention.

FIG. 2 is a layout drawing of the coating device used in this embodiment of the invention. In FIG. 2, numeral 21 indicates a Braun tube, numeral 22 indicates a coating solution bath, numeral 23 indicates a coating solution, numeral 24 indicates a solution feed valve, numeral 25 indicates a drain valve, numeral 26 indicates a constant rate pump, numeral 27 indicates a solution tank, numeral 28 indicates a solution feed pressure valve, and numeral 29 indicates a leaking valve.

In the above constitution, the Braun tube 21 is attached to the coating solution bath 22 with the surface to be coated facing the inner side of the bath. In this embodiment, the attaching surface of the coating solution bath 22 is provided with a packing or an O-ring shaped sealant to prevent leakage of the coating solution and a pressure gas during the application step. Further, in view of operability, the coating solution bath is also constituted so as to be sealed by merely inserting the Braun tube.

Then, the coating solution containing the ultrafine particles is introduced into a space formed between the coating solution bath 22 and the surface-to-be-coated of the Braun tube. For this introduction, first the drain valve 25 and the leaking valve 29 are closed and then the solution feed valve 24 and the solution feed pressure valve 28 are opened. The solution feed pressure valve 28 is connected to an air compressor so that the compressed air generated by said air compressor is gradually applied into the solution tank. By this operation, the coating solution 23 in the solution tank 27 is forced out therefrom to fill the space on the Braun tube surface. Then the solution feed valve 24 and the solution feed pressure valve 28 are closed while the drain valve 25 and the leaking valve 29 are opened and the constant rate pump 26 is operated, whereby the coating solution 23 on the Braun tube surface is charged back into the solution tank 27. In this case, it is possible to adjust the lowering rate of the coating solution 23 on the Braun tube surface by properly changing the solution feed rate of the constant rate pump 26. An inert gas such as N$_2$ gas may be used in place of compressed air for introducing the coating solution into the space above the Braun tube surface.

The mixing method for the preparation of the above coating solution will be described below.

For preparing the coating solution for forming an antistatic film applied as the first layer, ethyl Silicate [Si(OC$_2$H$_5$)$_4$] is dissolved in ethanol, and further, H$_2$O for hydrolysis and HNO$_3$ as a catalyst are added to form a solution, and the SnO$_2$ ultrafine particles having a particle size of 6 nm are added to the solution in an amount of 2% by weight. For preparing the coating solution for forming an anti-reflection film applied as the second layer, ethyl silicate [Si(OC$_2$H$_5$)$_4$] is dissolved in ethanol, and further H$_2$O for hydrolysis and HNO$_3$ as a catalyst are added to form a solution, and the SiO$_2$ ultrafine particles having a particle size of 120 nm are added to the solution in an amount of 5% by weight. The pH of the solution is adjusted so that the fine particles are well dispersed.

The above coating solution for forming an antistatic film was filled in said space to contact the surface-to-be-coated of the Braun tube, and after said surface has been perfectly covered with the coating solution, the solution level was lowered at a rate of 3.0 mm/s. The coat was force-dried with cold air. On this coat was applied the coating solution for forming an anti-reflection film in the same way. The coating rate in this coating operation was 2.5 mm/s. The coated Braun tube surface was left in a vessel filled with vapors of a chlorosilane compound used as water repellency agent to apply a water repellency treatment to the ultrafine particle film surface. Thereafter, the coating was fired in air at 160° C. for 30 minutes to decompose the ethyl silicate. The SnO$_2$ ultrafine particles and the SiO$_2$ ultrafine particles added to the respective solutions are firmly bonded and fixed to the Braun tube surface since SiO$_2$ formed by the decomposition works as a binder. The surface of the film forming the first layer has good and uniform wettability as the SnO$_2$ ultrafine particles are uniformly dispersed and coated thereon. Accordingly, the SiO$_2$ ultrafine particles in the second layer are uniformly arranged, allowing formation of a consistent unevenness. Further, the chlorosilane compound used as water repellency agent serves for substituting the active hydrogen of the hydroxyl group (OH) existing in the ultrafine particle and binder surfaces with the silyl group (R$_3$Si) (silylation). For instance, in the case of trimethylchlorosilane (Me$_3$SiCl), it is reacted with Si—OH in the ultrafine particle surface to produce Si—OSiMe$_3$ and HCl (Si—OH+Me$_3$SiCl=Si—OSiMe$_3$+HCl), and as a consequence, the surface is covered with CH$_3$ groups to provide water repellency thereto. Thus, as a result of the above reaction, there is formed a water repellent layer having a monomolecular layer strongly bonded thereto, and since CH$_3$ group alone exists in the surface, water repellency is provided thereto. Because of formation of said water repellent layer as a monomolecular layer, the depth of the gaps formed between the ultrafine particles remains substantially unchanged from that before the treatment. Therefore, the anti-reflective effect of the thus obtained ultrafine particle film is unchanged.

Figure 3:
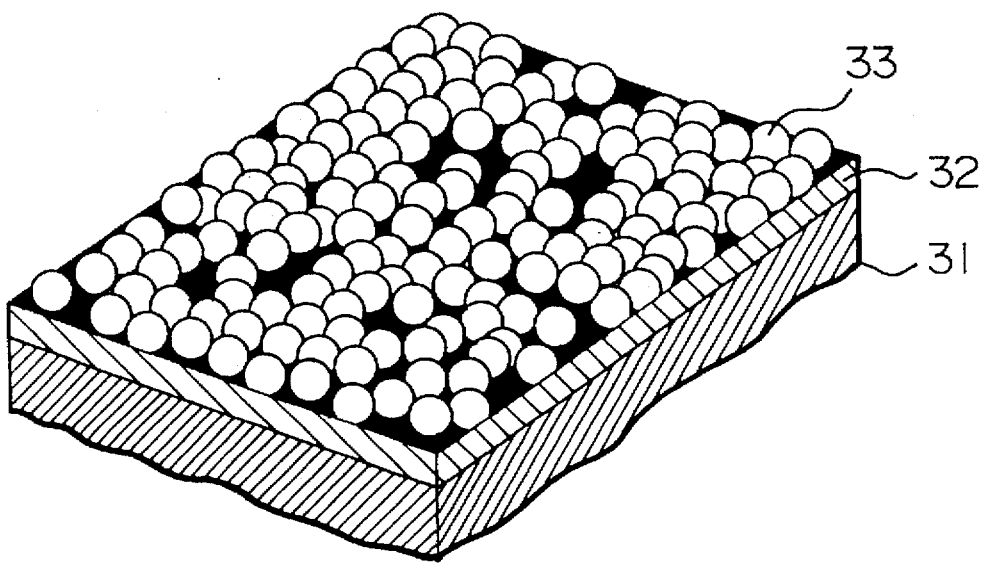
FIG. 3 is a sectional perspective view of one embodiment of the ultrafine particle film of the present invention.

FIG. 3 is a perspective view showing schematically the result of SEM (scanning electron microscope) observation through a cut section of a glass plate made of the same material as Braun tube and coated with the above-described film. In the glass plate 31, the SiO$_2$ ultrafine particles 33 having a particle size of 120 nm are arranged in a layer on an electroconductive film 32 formed with a substantially uniform thickness as the first layer. There are the parts where no ultrafine particles are present, but any of such parts is of an area capable of accommodating only 2 to 3 pieces of ultrafine particle, that is, about 240 to 360 nm in length, which is well smaller than the visible light wavelength, so that no significant effect is given on the reflection characteristics.

Figure 4:
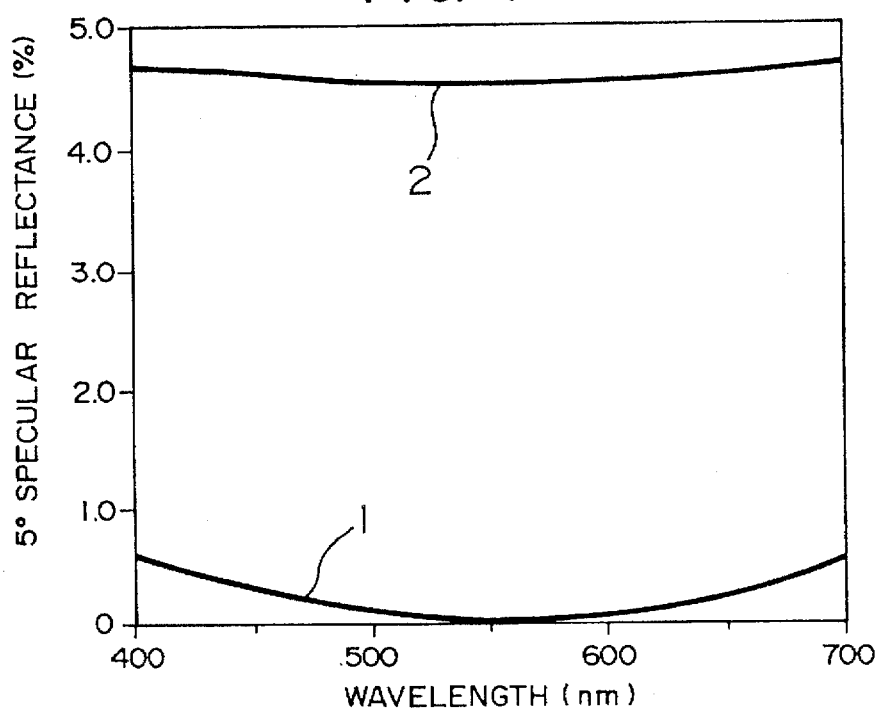
FIG. 4 shows reflection characteristics of an anti-reflection film to which an ultrafine particle film of the present invention has been applied.

The Braun tube surface having the above film formed was measured for a reflectivity of light at an incident angle of 5° to give a low reflectivity of 0.3% at a wavelength of 550 nm as shown by the curve I in FIG. 4-I. The similarly measured reflectivity of a conventional product (the curve II) (with no said film formed) was over 4.5% on the average.

Figure 5:
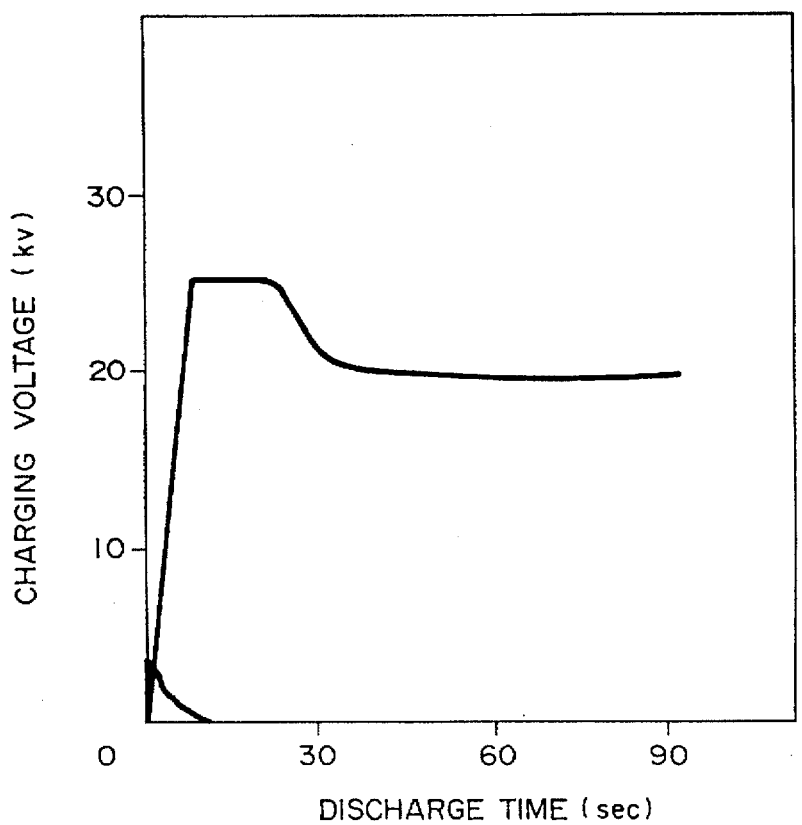
FIG. 5 shows antistatic characteristics of an antistatic film to which an ultrafine particle film of this invention has been applied.

On the other hand, the above film was measured for a surface resistance value to show about $10^8$ Ω/cm$^2$, and the antistatic characteristic of the film was as shown in FIG. 5, which shows that almost no charge appeared on the film according to this invention (indicated by I) as compared with a conventional characteristic (indicated by II) shown as a reference. A thin insulating layer of binder exists between the electroconductive ultrafine particles. It is known that the materials such as SnO$_2$ produce a tunnel effect to cause transfer of electrons, allowing the film to exhibit an electroconductive function.

Then, the antistatic low-reflectivity film of the present invention was rubbed with a rubber eraser (50-30 type, supplied by Lion Corp.) 50 times under a load of 1 kg. The reflectivity changed by about 0.1%, and there was therefore no problem on its quality. Also, a finger was strongly pressed against the film to form a fingerprint thereon and then it was tried to wipe it out with a close impregnated with ethyl alcohol. As a result, the fingerprint could be removed perfectly.

The above process of forming an antistatic, anti-reflection and water repellent ultrafine particle film can be applied for forming such a film directly on the surface of an article such as a completed Braun tube. Specifically, SnO$_2$ ultrafine particles and/or SiO$_2$ ultrafine particles are mixed in a Si(OR)$_4$ alcohol solution, this solution is applied on the surface of a Braun tube, the thus treated Braun tube surface is further treated with a silyl compound to form a water repellent film, and the thus formed water repellent ultrafine particle film on the Braun tube surface is fired in its entirety at around 160° C. By this simple process and operations, there can be formed an ultrafine particle film having excellent antistatic, anti-reflection and anti-staining properties as well as height stain removability and also uniform in quality.

In the above process for forming an antistatic, anti-reflection and water repellent film, a film can be directly formed on a completed Braun tube, and the procedures thereof are, for example, to mix SnO$_2$ ultrafine particles or SiO$_2$ ultrafine particles in an existing Si(OR)$_4$ alcohol solution, apply it, expose the resultant coating to a vapor of a water repellency agent and fire the thus formed coating. Thus, the above process gives products having a constant quality at a low cost.

The above embodiment has used Si(OR)$_4$ in which R was ethyl. However, as described earlier, Si(OR)$_4$ wherein R is C$_n$H$_m$ (m=2n+1) may be used in the range of n=1 to 5. With an increase in n, the viscosity of the solution increases slightly. Therefore, an alcohol compatible with the increase should be selected as a solvent in view of operability.

According to this embodiment, a film having excellent anti-reflection effect, antistatic function and water repellency can be formed on an image display plate by a simple apparatus and a simple coating operation. Further, the display plate of the present invention can be produced by a simple and safe process, and is suitable for mass-production and also excellent in anti-contamination durability.

Other embodiment will be described by reference to FIG. 6.

Figure 6:
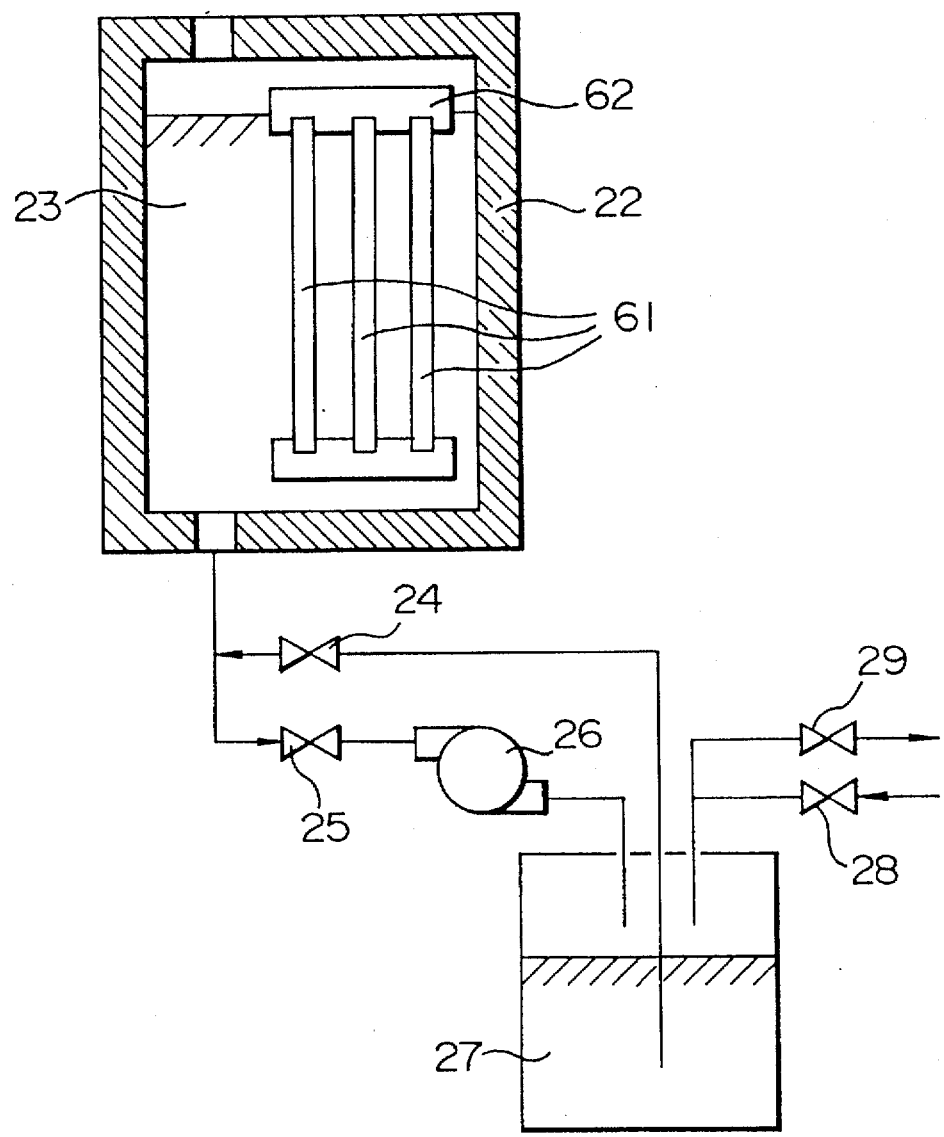
FIG. 6 is a layout drawing of another embodiment of the present invention.

FIG. 6 is a schematic layout drawing of a coating apparatus in another embodiment of the present invention. In this drawing, the same reference numerals are used to indicate the same parts as in FIG. 2. Numeral 61 indicates a transparent substrate and numeral 62 indicates a jig.

The transparent substrates 61, which were a glass plate in the previous embodiment, are a plastic plate in the present embodiment. These transparent substrates are fixed in position by jigs 62 and encased in a coating solution bath 22.

In the coating solution bath 22 are formed the openings for attachment and detachment of the jigs 62 and the objects to be coated (transparent substrates). Each of said openings is provided with a packing or an O-ring to prevent leakage of the coating solution and a pressure gas during the application step and to keep the inside of the coating solution bath 22 in a hermetically closed state.

After the transparent substrates 61 have been set in position in the coating solution bath 22 with the jigs 62, the coating solution containing the ultrafine particles is introduced into the space in the coasting solution bath 22. For this introduction, the draw valve 25 and the leaking valve 29 are closed while the solution feed valve 24 and the solution feed pressure valve 28 are opened. By this operation, the coating solution 23 in the solution tank 27 is forced out to flow into the coating solution bath 22.

Then, the solution feed valve 24 and the solution feed pressure valve 28 are closed while the drain valve 25 and the leaking valve 29 are opened and the constant rate pump 26 is operated, whereby the coating solution 23 filling the coating solution bath 22 is forced to return into the solution tank 27. In this operation, the movement of the coating solution 23 can be adjusted so that it will go down at a prescribed rate on the surface of each transparent substrate 61 by properly changing the feed rate of the constant rate pump 26. In this embodiment, the coating steps are substantially the same as illustrated in FIG. 1, but the step of attaching the Braun tube is replaced by a step of setting the jigs 62 in the coating solution bath 61, and the step of detaching the Braun tube is replaced by a step of lifting up the jigs 62 from the coating solution bath 61 and setting them in another coating apparatus. For three-layer coating, the above operation is carried out by using three different types of coating solution and three sets of coating apparatus of the same specifications.

The mixing method for the preparation of the above coating solution will be described below.

First, a coating operation is carried out for forming a precoat which constitutes the first layer. The coating solution for forming the precoat is prepared by dissolving ethyl silicate [$Si(OC_2H_5)_3$] containing γ-methacryloxypropyltrimethoxysilane in ethanol and further adding thereto $H_2O$ for hydrolysis and $HNO_3$ as a catalyst. For the preparation of the coating solution for forming an antistatic film which constitutes the second layer, ethyl silicate [$Si(OC_2H_5)_3$] containing γ-methacryloxypropyltrimethoxysilane is dissolved in ethanol, followed by addition of $H_2O$ for hydrolysis and $HNO_3$ as a catalyst, so far the same as the preparation of the precoat-forming coating solution, then the $SnO_2$ ultrafine particles having a particle size of 6 nm are added to the solution in an amount of 2% by weight. For preparing the coating solution for forming an anti-reflection layer (third layer), ethyl silicate [$Si(OC_2H_5)_4$] is dissolved in ethanol, followed by addition of $H_2O$ for hydrolysis and $HNO_3$ as a catalyst to form a solution, and the $SiO_2$ ultrafine particles having an average particle size of 80 nm are added to the solution in an amount of 5% by weight. The pH of the solution is properly adjusted so that the particles will be well dispersed. Further, a fluoroalkoxysilane compound is used as the water and oil repellency agent. Then coating was carried out successively with these three types of coating solution according to the above-described procedure by using the apparatus shown in FIG. 6. The coating conditions in the above coating operations are shown in Table 2.

TABLE 2

|  | Antistatic solution (1st layer) | Anti-reflection solution (2nd layer) | Water and oil repellency treating solution |
| --- | --- | --- | --- |
| Solvent (Mixed alcohol) | 95 wt % | 92 wt % | 95 wt % |
| Binder [Si(OR)$_4$] | 3 wt % | 3 wt % | — |
| Ultrafine particles | SnO$_2$ (particle diameter: 6 nm) 2 wt % | SiO$_2$ (particle diameter: 120 nm) 5 wt % |  |
| Water and oil repellency agent | — | — | (CH$_3$)$_2$Si(OCH$_3$)$_2$ 5 wt % |
| Coating rate | 3.0 mm/s | 2.5 mm/s | 2.0 mm/s |

Figure 7:
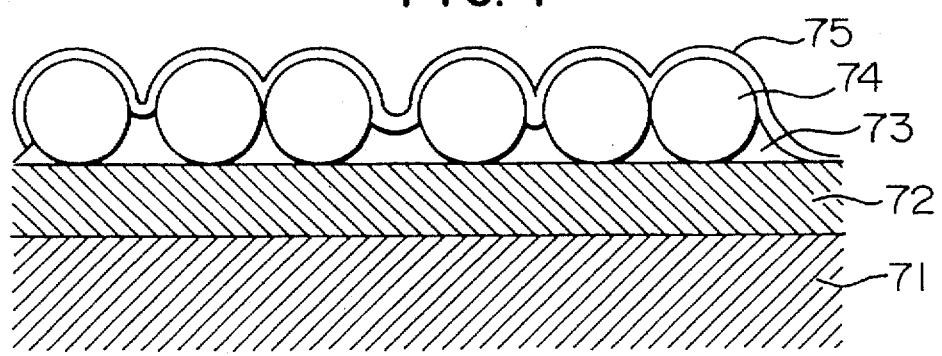
FIG. 7 is a schematic cross-sectional view of an ultrafine particle film in another embodiment of the present invention.

After completion of the three sequential runs of coating operation, the coating was fired at 50° to 120° C. depending on the type of the plastic material used. FIG. 7 is a schematic sectional view of the above-formed coating film on a substrate 71 as it was observed through SEM. On the surface of the substrate is formed an antistatic layer 72 which constitutes the first layer, and formed thereon is an anti-reflection layer 74, both being substantially uniform in thickness. Said layer 74 has the same anti-reflection function as in the case of the glass substrate. Further, the outermost layer surface is uniformly and thinly overcoated with a water repellent layer 75 comprising $CH_3$ formed through reaction with the fluoroalkoxysilane compound. Numeral 73 indicates a binder. The above procedure gave a film having excellent anti-reflective function, antistatic function, abrasion resistance, durability and stain removability.

In the above embodiment, an ultrafine particle film having a three-layer structure has been formed. It is possible to form an ultrafine particle film having a greater number of layers by additionally conducting the above-described process as many times as required.

Figure 8:
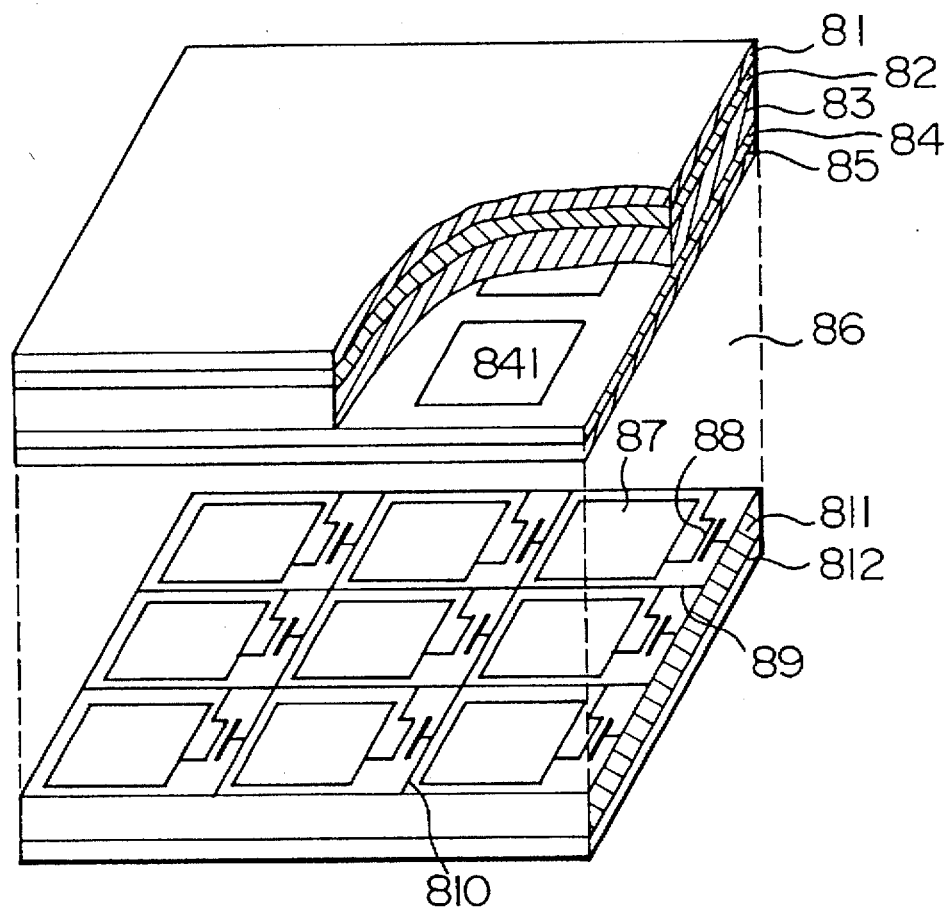
FIG. 8 is a partial sectional perspective view of a liquid crystal pannel to which the present invention has been applied.
Figure 9:
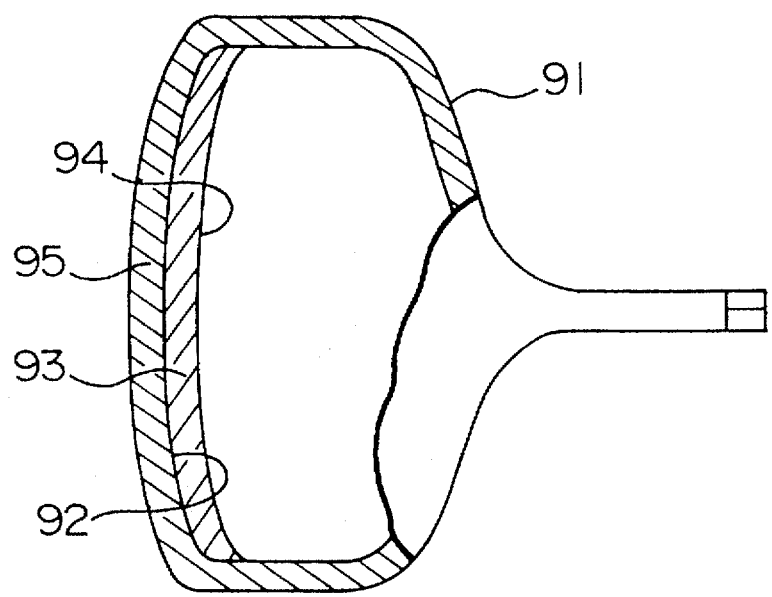
FIG. 9 is a general sectional view of a Braun tube to which the present invention has been applied.
Figure 10:
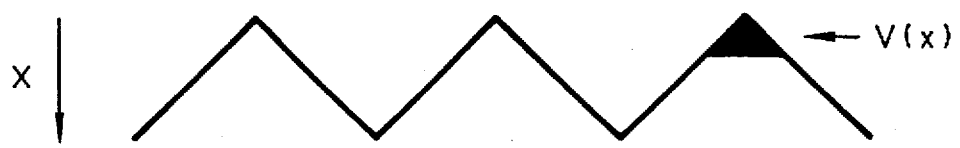
FIG. 10 is a schematic illustration of the anti-reflection principle of the present invention.
Figure 11:
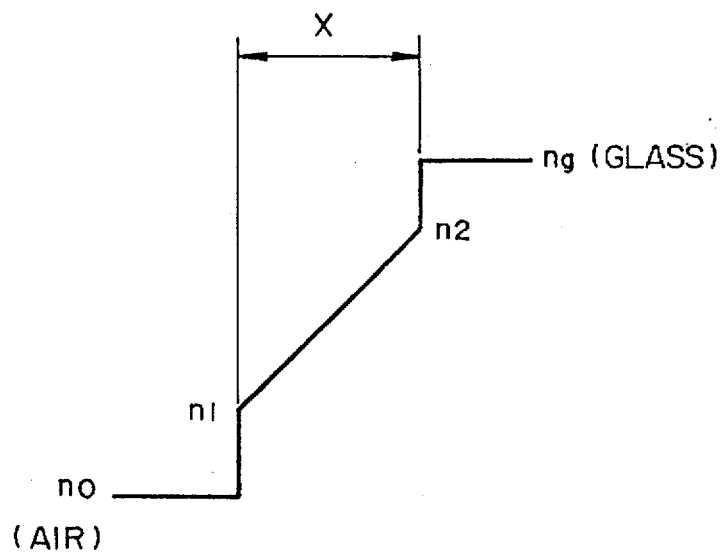
FIG. 11 is another schematic illustration of the anti-reflection principle of the present invention.
Figure 12:
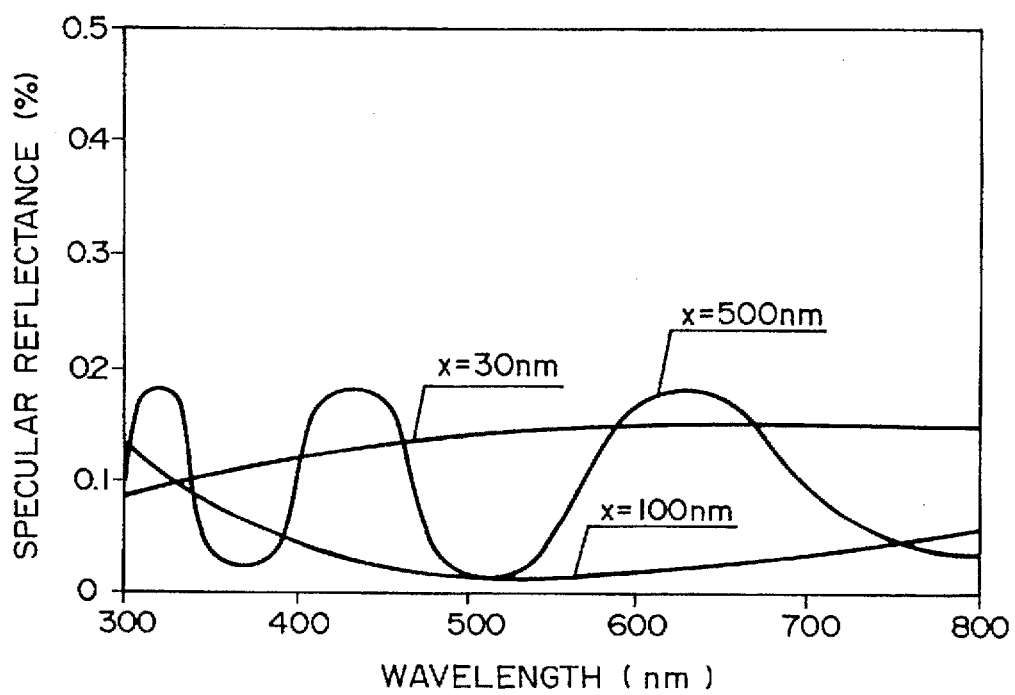
FIG. 12 shows reflection characteristics illustrating the anti-reflection principle of the present invention.
Figure 14:
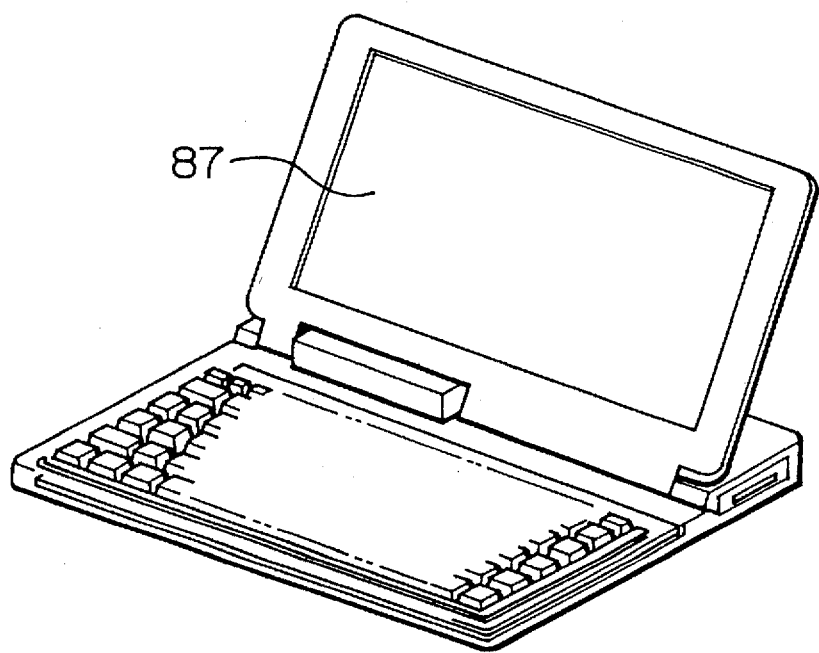
FIG. 14 is a perspective view of a personal computer using a liquid crystal pannel embodying the principle of the present invention.

FIG. 8 is a partly cut-out sectional perspective view of a liquid crystal pannel to which the above ultrafine particle film has been applied. In close proximity to one side of the liquid crystal (86) layer, and a glass substrate 83 and a polarizing plate 82 are laminated thereon. On the other side of the liquid crystal layer are laminated a glass substrate 811 and a polarizing plate 812. On the glass substrate 811 are provided the pixel electrodes 87 each of which is disposed in a defined area in positional alignment with the corresponding one of the pixels 841 formed on a color filter layer. The ultrafine particle film 81 of the present invention was applied to the surface of the deflecting plate 82 of a liquid crystal panel having the above-described structure. When a liquid crystal panel incorporated with the ultrafine particle film according to the present embodiment of the invention is applied to a liquid crystal display device (TFT) such as a personal computer shown in FIG. 14, the resolution of the image displayed on the liquid crystal panel 87 is improved.

In the prior art, unevenness of the submicron order has been provided on the surface of a liquid crystal display plate to effect dispersion of surface reflection. According to this treatment, although the possibility of image formation by the reflected light is eliminated, there is the problem that due to diffuse reflection, the normally formed image becomes foggy and the resolution is lowered or the contrast is impaired, making a cause of fatigue of the operator's eyes. The above embodiment of the present invention is free of such problem since reflection is substantially prevented as described above. According to the conventional system, only 65–70 lines/cm can be perceived by the human eye, whereas in the present embodiment of the invention, more than 85 lines/cm, which is considered the limit of resolution by the human eye, can be perceived.

Figure 13:
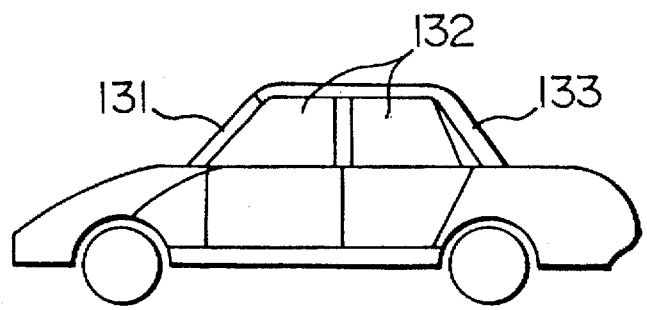
FIG. 13 is a schematic drawing of an automobile in which the present invention is incorporated.

FIG. 13 illustrates an application of the ultrafine particle film of the present invention to window glass of an automobile.

When water droplets or a non-uniform water film is formed on window glass, especially windshield 131 of an automobile, the visibility is worsened to give rise to the safety problem. This problem has been principally dealt with by employment of wipers for cleaning off water. Recently, water repellency agents are commercially available. These agents are easy to apply, but the glass surface treated with these agents shows a contact angle of around 90°, so that the water droplets on the wind shield can be removed by wind pressure only when the vehicle speed is higher than 60 km/h. On the other hand, the glass applied with the ultrafine particle film of the present invention shows a contact angle of around 130°, so that desired water removal can be effected even when the vehicle speed is below 40 km/h, which is quite a favorable matter for safety in vehicle driving. Such water droplet removing effect is provided not only on windshield but also on door glass 132 or rear glass 133 by application of the ultrafine particle film of the present invention.

We often experience in an art gallery that a work of art, such as a picture, covered by a protective transparent plate (mainly glass or plastic) is hard to see as the transparent plate reflects illumination light or other matter. Various anti-reflection measures are applied for illumination or lighting, but they are ineffective when the work is seen from a certain angle, and in some cases, the work can scarcely be seen. Generally the transparent plates used for protection of the works of art are large in size, and physical difficulties are often encountered for applying a three-layer deposition film which has conventionally been used as an anti-reflection film. Even if an anti-reflection film could be applied to a large-sized transparent plate, the apparatus used therefor ought to be large-scaled and hence costly. Use of the process of the present invention, however, enables easy application of a coating film regardless of the size of the object on which the film is to be applied.

According to the present invention, as described above, it is possible to easily form a visible light anti-reflection film, an antistatic film and/or an infrared-reflection film, which is highly proof against staining and from which stains, should they adhere, can be easily removed, on a substrate by a simple coating method using the ultrafine particles.

What is claimed is:

1. A transparent plate comprising a transparent substrate, an antistatic layer comprising electrically conductive ultrafine particles formed on said substrate, an anti-reflective layer comprising visible light anti-reflection ultrafine particles arranged in a single layer on said antistatic layer of electrically conductive ultrafine particles and having a surface exhibiting consistent unevenness with a depth of 20–100 nm, and a monomolecular layer of a water repellant agent formed on said anti-reflective layer of visible light anti-reflection ultrafine particles.

2. A transparent plate according to claim 1, wherein the visible light anti-reflection ultrafine particles are $SiO_2$ ultrafine particles having a diameter of 40 to 200 nm.

3. A transparent according to claim 1, wherein the monomolecular layer has a surface of $CH_3$ group of $CF_3$ group.

4. A transparent plate according to claim 1, wherein said visible light anti-reflection ultrafine particles are made of a material selected from the group consisting of $SiO_2$ and $MgF_2$.

5. A transparent plate according to claim 1, wherein said electrically conductive ultrafine particles are made of a material selected from the group consisting of $SnO_2$, $SnO_2+Sb_2O_3$, $In_2O_3$, and $In_2O_3+SnO_2$.

6. A transparent plate according to claim 1, wherein said antistatic layer of electrically conductive ultrafine particles further comprises infrared-reflection ultrafine particles.

7. A transparent plate according to claim 6 wherein said infrared-reflection ultrafine particles are made of a material selected from the group consisting of $SnO_2$, $SnO_2+Sb_2O_3$, $In_2O_3$, $In_2O_3+SnO_2$, $TiO_2$, and $ZrO_2$.

8. A transparent plate according to claim 1, wherein said visible light anti-reflection ultrafine particles are uniformly arranged and bound with a binder.

9. A transparent plate according to claim 8, wherein said transparent substrate is made of glass and said binder is $Si(OR)_4$, where R is an alkyl group.

10. A transparent plate according to claim 8, wherein said transparent substrate is made of plastic and said binder comprises $Si(OR)_4$, where R is an alkyl group, and a coupling agent having a functional group pertinent to plastic.

11. A transparent plate according to claim 10, wherein said coupling agent is selected from the group consisting of γ-methacryloxypropy thimethoxysilane and γ glycidoxy-dipropyltrimethoxysilane.

12. A transparent plate according to claim 1, wherein said electrically conductive ultrafine particles have a particle size of 10 nm or less.

13. A transparent plate according to claim 1, wherein said water repellant agent is a silyl compound.

14. A transparent plate according to claim 1, wherein said water repellant agent is made of a material selected from the group consisting of a chlorosilane compound, an alkoxysilane compound, and a fuloroalkylsilane compound.

15. A transparent plate according to claim 1, wherein said water repellant agent is made of a material selected from the group consisting of $CH_3SiCl_3$, $(CH_3)HSiCl_2$, $(CH_3)_2SiCl$, $CH_3Si(CH_3)_3$, $(CH_3)_2Si(OCH_3)_2$, $CH_3Si(OC_2H_5)_3$, $(CH_3)_2Si(OC_2H_5)_2$, $CF_3CH_2CH_2Si(OCH_3)_3$, $CF_3CH_2CH_2SiCl_3$, and $CF_3(CF_2)CH_2CH_2SiCH_3Cl_2$.

* * * * *